May 27, 1941.  J. H. BALLARD  2,243,064

PISTON RING

Filed Feb. 12, 1940

Inventor
John H. Ballard
By Livernee and
Van Antwerp
Attorneys

Patented May 27, 1941

2,243,064

UNITED STATES PATENT OFFICE 2,243,064

PISTON RING

John H. Ballard, North Muskegon, Mich., assignor to Sealed Power Corporation, Muskegon, Mich., a corporation of Michigan Application February 12, 1940, Serial No. 318,573

3 Claims. (Cl. 309—45)

This invention relates to piston rings and more particularly to the quick seating type of piston ring.

The purpose of a quick seating ring is to conform its periphery to the cylinder wall in a minimum time and it is accomplished by providing a small area extending around the periphery which will wear down quickly and in so doing accurately conform to the cylinder wall and thereafter the larger area of the periphery of the ring will bear against the wall.

Figure 1:
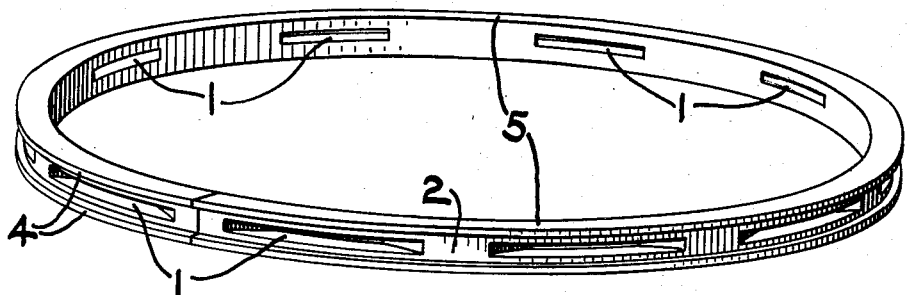

One of the objects of this invention is to provide a structure which may be quickly and accurately machined in large quantities to reduce the manufacturing costs and at the same time to produce a good well fitting ring. The invention provides other valuable features of construction and arrangement hereinafter more fully described and particularly pointed out in the claims, reference being had to the accompanying drawing, in which, Fig. 1 is a perspective view of a ring embodying this invention.

Figures 2, 3, 4:
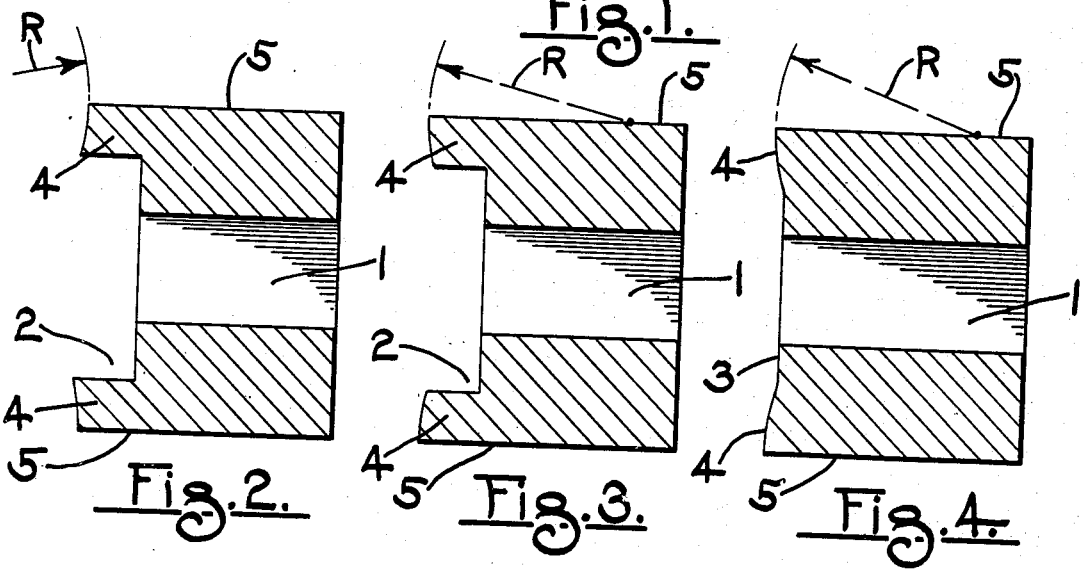
Figure 5:
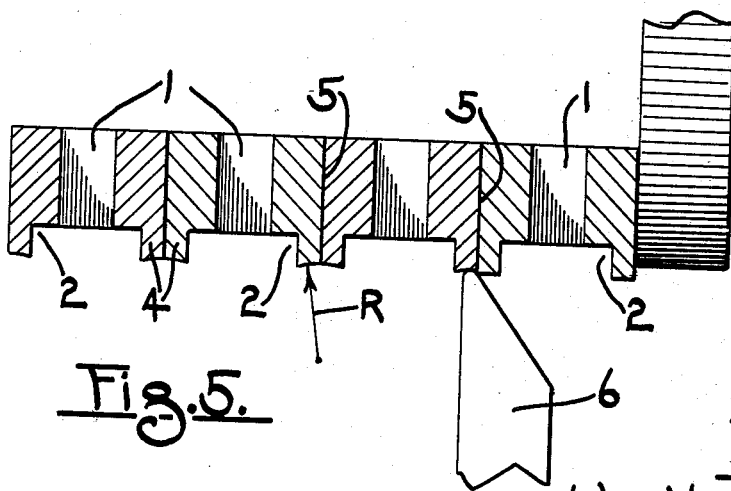

Figs. 2, 3 and 4 are each enlarged cross sections of the ring showing different specific forms thereof, and Fig. 5 is a fragmentary view showing cross sections of a plurality of rings clamped together for machining with the cutting tool in operating position.

Like numbers refer to like parts in all the figures.

The rings shown are of the oil ring type provided with slots 1 extending completely through them for the passage of oil. The outer peripheries of the rings shown in Figs. 2 and 3 are provided with annular grooves 2 while in the style shown in Fig. 4 the groove is reduced in depth so that it is merely a slight depression 3. In all styles there are annular extensions or lands 4 adjacent the respective flat surfaces 5 of the ring and it is the peripheries of these lands 4 which bear against the cylinder wall, the rings being located in ring grooves in the piston in the conventional manner.

In order to provide a small bearing area for quick seating purpose the peripheries of the lands are curved or arc-shaped and the axes of the arcs are located approximately at the planes of the flat surfaces of the ring. In the style shown in Fig. 2 the axis of the arc is outside of the periphery of the ring while in the styles shown in Figs. 3 and 4 the axes of the arcs are within the peripheries of the ring. The radius is represented by R in the various figures.

These piston rings usually have their peripheries finished in a lathe in which they are clamped in groups in a fixture such as is shown in the patent to J. E. Porter No. 1,897,397, issued February 14, 1933. The rings are clamped in multiple in the fixture with their flat surfaces in contact and are rotated on the lathe spindle or mandrel and the cutting tool 6 is moved against the peripheries of the lands 4 and caused to follow an arcuate path during its movement. Although the width of the rings is quite accurate there is usually a slight difference in width between various groups of them and when a plurality of the rings are clamped in a fixture the difference in width is multiplied by the number of rings so that it is impracticable to know accurately where the dividing lines between the respective rings will be located relative to the lathe and the templet which guides the cutting tool in its arcuate movement.

With the present shaped ring, however, it is not important that the tool shall reach the apex of its movement exactly at the division between two rings but if this point approximates the division between the rings the slight discrepancy is corrected by the radius R. In other words, that portion of the surface of the periphery adjacent the flat surfaces of the rings so closely approximates a right angle with the flat surface that it may vary one way or the other to some extent without being noticeable and the cut of the tool following the radius R may pass its apex at either side of the flat surfaces of the lands 4 in the manner described.

Therefore, by machining the peripheries of the lands on arcs whose centers are approximately in the planes in the flat surfaces of the rings the desired curved cross sectional surface may be obtained by a practical machining operation and the rings may be made in quantities at a minimum expense.

Where a sharp bearing edge is desired for extremely quick seating the style illustrated in Fig. 2 may be used in which the radius of the arc is outside the periphery of the ring. Where this quick seating surface is not desired to be quite so sharp the styles shown in Fig. 3 or 4 may be used in which the axis of the arc is located within the periphery of the ring but in all cases the peripheries are cut on arcs whose centers are approximately at the flat faces of the rings.

The invention is defined in the appended claims and is to be considered comprehensive of all forms of structure coming within their scope.

I claim:

1. A piston ring having bearing lands on its periphery adjacent its flat faces, the peripheries of said lands being shaped on axially extending arcs whose centers are located approximately in the planes of the flat faces of the ring and inside the periphery thereof.

2. A piston ring having drainage passages therethrough between its opposed flat sides and having a continuous oil collecting annular groove around the ring at its outer curved portions, said groove being located between two ribs and the groove having communication with said drainage passages, said ribs having outer bearing land surfaces to cooperate with a cylinder wall of a cylinder in which the ring is adapted to operate, said bearing land surfaces of said ribs each being of curved form having centers of curvature respectively located approximately in the planes of the adjacent flat sides of the ring and inside the periphery thereof.

3. A piston ring having oil passages therethrough between opposed flat sides and an oil collecting groove in the outer curved peripheral portion thereof, said groove communicating with said passages and being located between two ribs, the outer sides of which are in the same planes with the flat sides of the ring and the inner sides of which are spaced from said oil passages in the ring, the outer edges of the ribs each curving inwardly in the arc of a circle to the groove from each outer flat side of the ring.

JOHN H. BALLARD.